US006099739A

United States Patent [19]

Kobayashi

[11] Patent Number: 6,099,739

[45] Date of Patent: Aug. 8, 2000

[54] CLEANING APPARATUS FOR A MAGNETIC FILTER AND CLEANING METHOD THEREOF

[75] Inventor: Mikio Kobayashi, Mie, Japan

[73] Assignee: Honda Giken Kogyo Kabushiki Kaisha, Tokyo, Japan

[21] Appl. No.: 09/195,803

[22] Filed: Nov. 19, 1998

[30] Foreign Application Priority Data

Nov. 27, 1997 [JP] Japan .................................... 9-326335

[51] Int. Cl.[7] ..................................................... B01D 35/06

[52] U.S. Cl. .......................... 210/695; 210/739; 210/745; 210/746; 210/791; 210/103; 210/105; 210/108; 210/111; 210/143; 210/222; 210/418; 210/425

[58] Field of Search .................................... 210/695, 739, 210/740, 745, 746, 767, 791, 85, 94, 95, 103, 105, 108, 111, 143, 222, 418, 425

[56] References Cited

U.S. PATENT DOCUMENTS 5,635,074 6/1997 Stenstrom et al. ........................ 210/739
5,766,450 6/1998 Herman et al. .......................... 210/222

FOREIGN PATENT DOCUMENTS 8296089 11/1996 Japan .

*Primary Examiner*—David A. Reifsnyder
*Attorney, Agent, or Firm*—Birch, Stewart, Kolasch & Birch, LLP

[57] ABSTRACT

A cleaning apparatus for a magnet filter and a method of cleaning a magnetic filter. The magnetic filter is disposed in a circular passage for processing a cleaning fluid. The cleaning apparatus includes sensors for determining when the magnetic filter should be cleaned, which prevents a loss of effectiveness of the cleaning fluid due to detached metal powder falling off of the filter.

20 Claims, 6 Drawing Sheets

FIG. 8

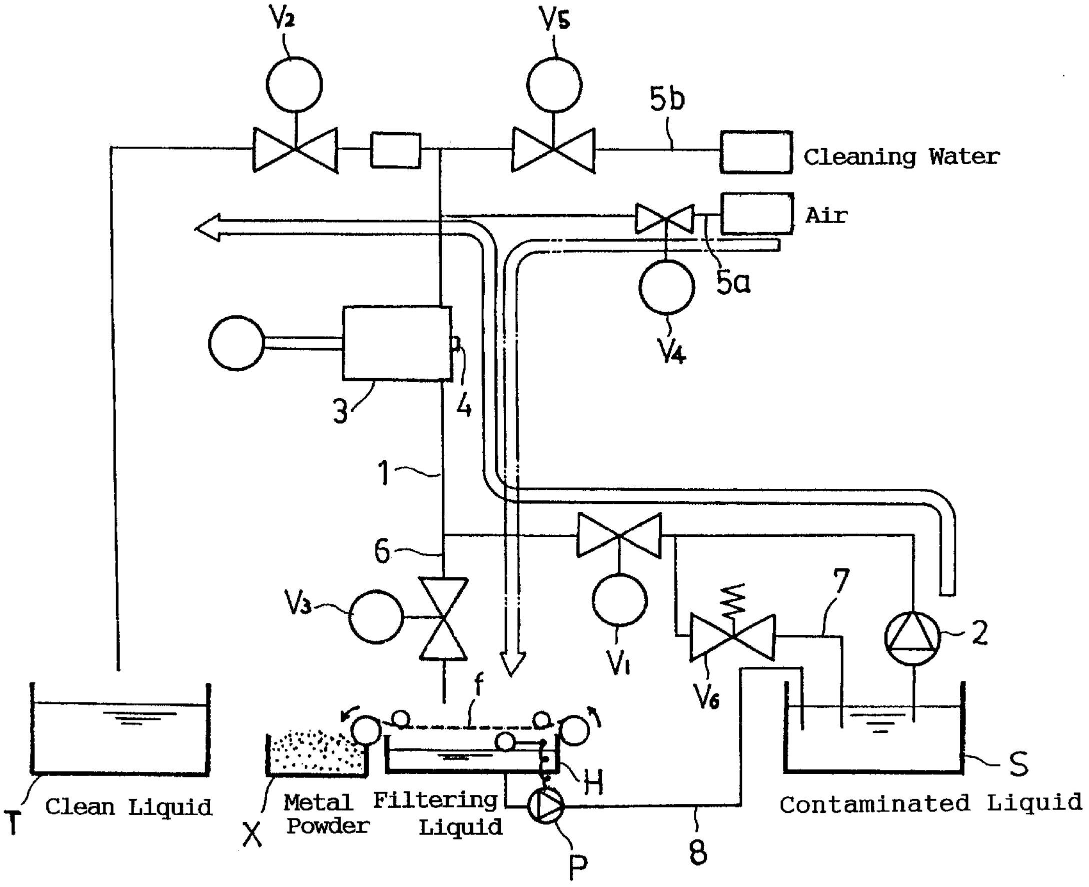

| | During Removal of Iron | During Cleaning | During Removal of Iron |
|---|---|---|---|
| 1st Electro-magnetic Valve (V1) | Open Valve | Close Valve | Open Valve |
| 2nd Electro-magnetic Valve (V2) | Open Valve | Close Valve | Open Valve |
| 3rd Electro-magnetic Valve (V3) | Close Valve | Open Valve | Close Valve |
| 4th Electro-magnetic Valve (V4) | Close Valve | Open Valve | Close Valve |
| 5th Electro-magnetic Valve (V5) | Close Valve | Open Valve | Close Valve |
| Magnetic filter | ON | OFF | ON |

CLEANING APPARATUS FOR A MAGNETIC FILTER AND CLEANING METHOD THEREOF

BACKGROUND OF THE INVENTION

1. Field of the Invention

The present invention relates to a cleaning apparatus and a cleaning method for a magnetic filter for removing metal powder from a treatment liquid in a container in a pre-painting process for, for example, the body of an automobile.

2. Description of Related Art

Conventionally, as equipment for removing metal powder contained in treatment liquid, which is used, for example, when treating the body of an automobile with a pre-painting process, a metal powder removing device is already known in, for example, Japanese Patent Laid-Open No. 8-296089 (1996).

In this equipment, there is provided a metal powder removing portion for removing the metal powder contained in the treatment liquid, which comprises a cylindrical powder collector portion projecting into a circular passage in which the treatment liquid is circulated, and a powder collector magnet which is freely movable both inside and outside of the cylinder of the powder collector portion, and can thereby attract the metal powder from the treatment liquid bypassing within the circulating passage and attach or adhere it upon a surface of the powder collector portion. Further, when the powder collector portion is being cleaned, it is connected to a cleaning circuit by controlling valves provided therearound, and after the powder collector magnet is drawn out from inside of the cylinder of the powder collector portion so as to determine the effect of magnetic powder thereof, cleaning liquid and cleaning air are introduced to clean out and remove the metal powder attached to the surface of the powder collector portion, etc. This cleaning operation is conducted periodically.

However, with the prior art mentioned above, since the cleaning operation is done periodically, if the amount of the metal powder that is generated increases, for instance, due to changes in the production volume or changes in the type of production, a large amount of the metal powder accumulates upon the surface of the powder collector portion in layers and exceeds a practical limit. If the amount being collected exceeds the limit in this way, a portion of the metal powder in a cake or mass can be peeled off from the portion being accumulated in layers. Therefore, there are drawbacks in that the excess powder is turned back (leaked) into a processing container through the circulating passage, for example, and that it becomes disadvantageously attached onto the surface of the car body thus giving poor results, since it carries some amount of magnetism.

SUMMARY OF THE INVENTION

Therefore, in accordance with the present invention, for resolving the drawbacks in the conventional art mentioned above, an object is to provide a cleaning apparatus for a magnetic filter that avoids the drawback wherein the quantity of accumulated metal powder exceeds a limit of the metal powder removing equipment and wherein a mass of the metal powder disadvantageously peels off.

Furthermore, in accordance with the present invention, for resolving the drawbacks in the conventional art mentioned above, another object of the present invention is to provide a cleaning method for a magnetic filter that avoids the drawback wherein the accumulated metal powder exceeds a limit of the metal powder removing equipment in the amount thereof and that a mass of the metal powder peels off from it.

In accordance with the present invention, for accomplishing the above-mentioned object of the invention, there is provided a cleaning apparatus for cleaning a magnetic filter which collects metal powder from a treatment liquid flowing within a liquid passage, comprising:

- a cleaning circuit to remove the metal powder from the magnetic filter;
- cleaning time detection means provided in a vicinity of the magnetic filter for determining a cleaning time of the magnetic filter; and
- means for actuating a valve of the cleaning circuit upon receipt of a detection signal from the cleaning time detection means, whereby the cleaning of the magnetic filter is actuated automatically.

Further, the cleaning is initiated automatically, at a time prior to the time when the metal powder collected by the magnetic filter reaches a predetermined amount (before reaching a limit), by the cleaning time detection means, thereby avoiding the drawback that the mass of the accumulated metal powder peels off from the magnetic filter.

Here, as the magnetic filter, a metal powder removing portion of the magnetic moving type or the like can be applied thereto, as is disclosed in, for example, Japanese Patent Laid-Open No. 8-296089 (1996).

Further, the cleaning time detection means can detect the metal powder amount collected upon the magnetic filter directly, for example, or it may detect the metal powder contained in the treatment liquid at a downstream location lower than the magnetic filter, or before and after its location indirectly, so as to decide the limit of collection capacity of the magnetic filter.

Further, as the cleaning time detection means there is provided a detection portion for measuring the amount of the metal powder attached onto a metal powder attaching portion of said magnetic filter, by which the cleaning time is decided on the basis of detected data received from the detection portion.

In this way, by detecting the amount of the metal powder attaching onto the metal powder attaching portion of said magnetic filter directly, the determination of the cleaning time can be appropriately made.

Here, as the detection portion for measuring the amount of attached metal powder, it is possible to apply, for example, an ultrasonic sensor in which a transmission path is shut down by the metal powder, or a light sensor, and so on.

Further, the detection portion is constructed with an ultrasonic sensor which outputs ultrasonic waves in a vicinity of the metal powder attaching portion of the magnetic filter and receives a reflected waves thereof, thereby deciding on the cleaning time based on the intensity of the reflected wave.

When no metal powder attaches onto the metal powder attaching portion of said magnetic filter, the ultrasonic waves simply pass by as it is in the vicinity thereof. On the other hand, when the attached metal powder exceeds the predetermined amount, then the ultrasonic wave is shut down so as to decrease the intensity (a sound pressure level) of the reflected wave. In addition, the cleaning is initiated when the intensity (the sound pressure level) of the reflected waves reaches the predetermined value.

Here, by constructing the ultrasonic sensor as a single sensor so that it outputs and receives the ultrasonic wave by itself, there is less restriction on the position for the installation thereof, and the apparatus can be constructed simply.

Further, as another cleaning time detection means, there is provided a detection portion for measuring the amount of metal powder contained in the treatment liquid at a downstream location lower than the magnetic filter, thereby deciding upon the cleaning time based on the detected data of the detection portion.

In this way, knowing the limit of the collecting capacity of the magnetic filter or the like by detecting the amount contained in the treatment liquid at a downstream location lower than the magnetic filter indirectly, it is thereby possible to attach the sensor at a position where fewer restrictions are imposed, and further to construct the apparatus in a simple and inexpensive manner.

Here, to the detection portion there can be applied an ultrasonic permeating method, for example, with which the contained amount of the metal powder is detected by measuring the transmission velocity of the ultrasonic wave through the treatment liquid, and also a coil detection method, with which a change is caused in an induction current when the metal powder (conductive material) passes by in the treatment liquid.

Further, as other cleaning time detection means, there are provided detection portions for measuring the amount of metal powder contained in the treatment liquid before and after the magnetic filter location, respectively, whereby the cleaning time is decided on the basis of a comparison between detected data from the detection portions.

Here, ordinarily, the amount of metal powder contained therein at the prior location (the upstream side) of the magnetic filter is larger than that at the latter location (the downstream side). However, when the amount attaching onto the magnetic filter reaches the limit, the amount at the downstream side comes to be larger than that at the upstream. Then, for an example, the cleaning time is set at the time when the relationship between measured values is reversed.

In addition, in this case, it is possible to attach the sensor at the position where less restriction is imposed, and further to construct it relatively simple and cheap.

Further, said detection portions for measuring the amount of metal powder contained in the treatment liquid before and after the magnetic filter are constructed with ultrasonic sensors for measuring the permeating velocity of the ultrasonic wave through the treatment liquid.

By measuring the permeating velocity of the sonic wave through the treatment liquid, the amount of metal powder can be determined. Here, the transmission velocity of the sonic wave changes depending on the amount of metal powder contained in the treatment liquid. For example, if the sonic velocity in water is 1,500 m/sec, the sonic velocity in steel is 5,900 m/sec under the same conditions, and therefore, if the amount of metal powder contained in the treatment liquid is larger than when it is clear, the transmission velocity becomes faster while the transmission time becomes shorter.

Further, a conduit of said passage of the treatment liquid, on which said ultrasonic sensor is attached, is formed with a flat surface for attaching the ultrasonic sensor thereon.

Here, if the ultrasonic sensor is attached on a curved surface of the conduit, noise is caused during the measurement due to a layer of air lying between the attachment surface of the sensor and the conduit. Therefore, for closely contacting the attaching surface of the sensor to the conduit, the surface of the conduit is machined by a milling cutter so as to be flat.

Further, the detection portion is constructed with a coil positioned in a vicinity of the conduit of the treatment liquid.

By flowing current through the coil which is positioned in the vicinity of said passage of the treatment liquid so as to apply a magnetic field at a right angle (90°) with respect to the flow of the treatment liquid and to cause an inductance current to be generated, and as well as by detecting the variations in the inductance current, the amount of metal powder contained in the treatment liquid can be determined.

In addition to the above, in accordance with the present invention, there is also provided a cleaning method for a magnetic filter, for cleaning the magnetic filter which collects metal powder from a treatment liquid flowing within a liquid passage, comprising the steps of:

detecting a condition of the magnetic filter;

determining a cleaning time for the magnetic filter on the basis of the detected condition of the magnetic filter;

actuating a valve of a cleaning circuit for use of removing the metal powder from the magnetic filter, upon the determination of the cleaning time for the magnetic filter, whereby the cleaning of the magnetic filter is actuated automatically.

In addition, also in accordance with the present invention, there is provided a cleaning method for a magnetic filter as defined above, wherein the detecting of the condition of the magnetic filter is conducted by measuring the amount of metal powder attached onto a metal powder attaching portion of the magnetic filter, whereby the cleaning time can be determined on the basis of detected data from the measurement of the amount of the attached metal powder attached onto the metal powder attaching portion.

Further, in accordance with the present invention, there is provided a cleaning method for a magnetic filter as defined above, wherein said detection of the condition of the magnetic filter is conducted by means of an ultrasonic sensor which outputs ultrasonic waves in a vicinity of the metal powder attaching portion of said magnetic filter and receives a reflected waves thereof, whereby the cleaning time is determined based on the intensity of the reflected waves detected by the ultrasonic sensor.

Further, in accordance with the present invention, there is provided a cleaning method for a magnetic filter as defined above, wherein the detection of the condition of the magnetic filter is conducted by measuring the amount of metal powder in the treatment liquid at a downstream location lower than said magnetic filter, whereby the cleaning time is determined on a basis of the measured amount of the metal powder obtained thereby.

Further, in accordance with the present invention, there is provided a cleaning method for a magnetic filter as defined above, wherein the detection of the condition of the magnetic filter is conducted by measuring the amount of metal powder in the treatment liquid before and after the magnetic filter, respectively, whereby the cleaning time is determined based on a comparison between detected data therefrom.

Further, in accordance with the present invention, there is provided a cleaning method for a magnetic filter as defined above, wherein said measurement is conducted with an ultrasonic sensor for measuring a permeating velocity of ultrasonic waves through the treatment liquid.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4(A) shows a condition where no metal powder attaches onto a metal powder attaching portion, and FIG. 4(B) a condition where some metal powder attaches onto the metal powder attaching portion;

FIG. 6(A) shows a condition where a conduit is formed flat at the attaching surface thereof, and FIG. 6(B) a condition where the attaching surface has a curved surface;

FIG. 8 is a chart for explaining a control method for valves of a circuit in the cleaning apparatus.

DESCRIPTION OF THE PREFERRED EMBODIMENTS

Hereinafter, detailed explanation of the embodiments according to the present invention will be given by referring to attached drawings.

The cleaning apparatus for a magnetic filter, according to the present invention, is constructed so as to clean the magnetic filter which removes metal powder mixed into treatment liquid for use in certain processes, such as grease removing, a chemosynthesis process, or water cleaning, etc., A magnetic filter is positioned in the way or passage of a circular passage for circulating a portion extracted from the treatment liquid stored in a processing container, while the treatment liquid, after being treated by removing the metal powder with the magnetic filter, is returned back to the processing container.

Figure 1:
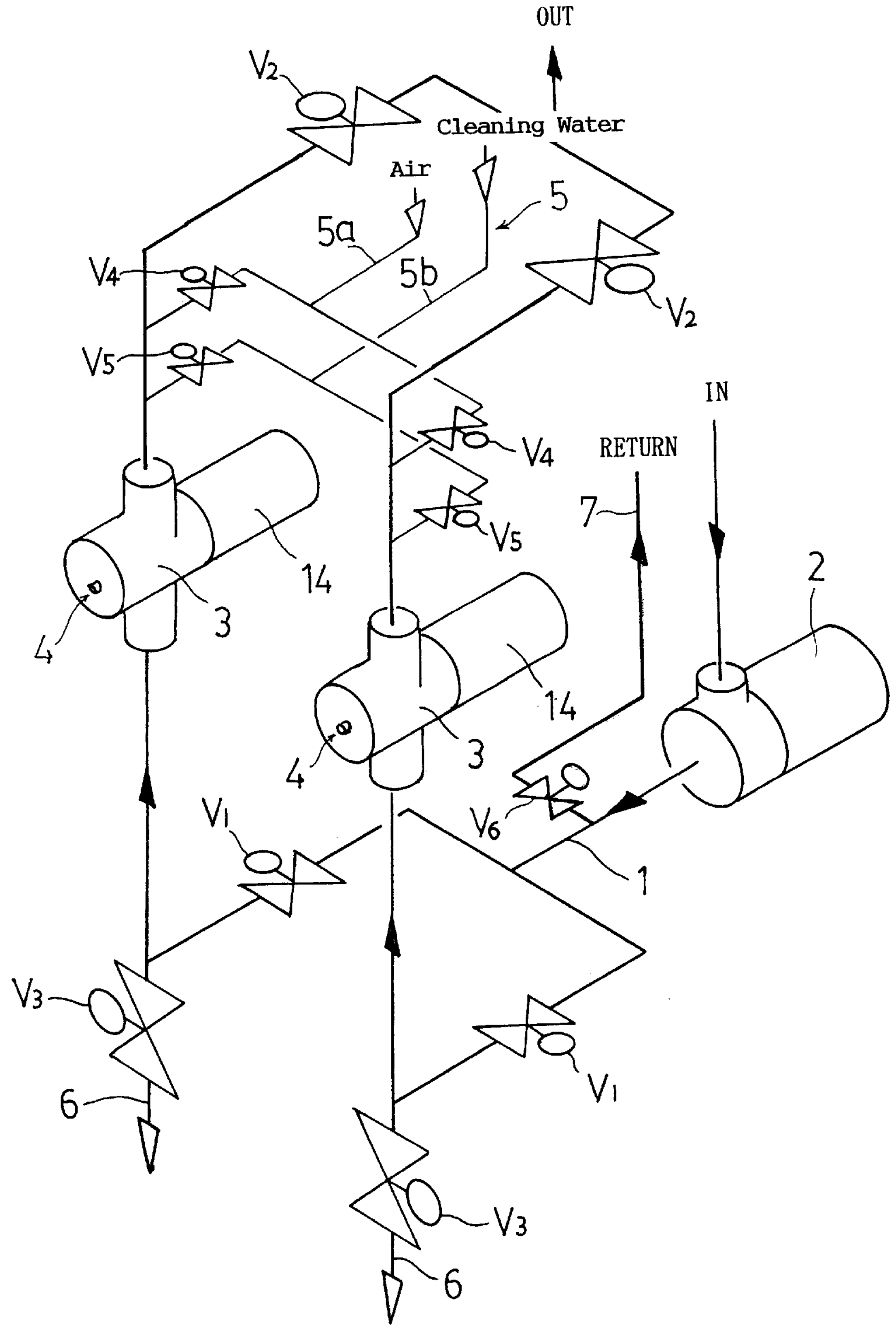
FIG. 1 is a schematic diagram showing circuitry used in the present cleaning apparatus.

Namely, as shown in FIG. 1, in the circular passage 1, there are provided a pump 2 for pumping the treatment liquid containing the metal powder from a processing container (not shown in the figure), a pair of first electro-magnetic valves V1 for controlling the opening and closing of the circular passage 1 at a downstream location with respect to the pump 2, two magnetic filters 3 for collecting the metal powder downstream of the first electro-magnetic valves V1, two detection portions 4, each for detecting the amount of metal powder attached to the magnetic filters 3, and a pair of second electromagnetic valves V2 for controlling the opening and closing of the circular passage 1 at a downstream location with respect to the detection portions 4. According to this construction, the treatment liquid passing through the second electro-magnetic valves V2 is returned back to the processing container, for example.

Further, in the circular passage 1 downstream of each magnetic filter 3, there is connected a cleaning circuit 5, which comprises an air cleaning circuit **5*a* for outputting cleaning air toward the magnetic filters 3 and a water cleaning circuit 5*b* for outputting cleaning water thereto, and thereby the metal powder accumulated on the magnetic filters 3 can be discharged by the action of the cleaning air and/or the cleaning water into two drain circuits 6**.

In addition, in each drain circuit 6 there is provided a third electro-magnetic valve V3, and also in the air cleaning circuit **5*a* of the above-mentioned cleaning circuit 5, there are provided fourth electromagnetic valves V4, and in the water cleaning circuit 5*b* fifth electromagnetic valves V5**.

However, between the above-mentioned pump 2 and the first electro-magnetic valves V1 there is provided a return circuit 7, in which circuit there is provided a sixth electro-magnetic valve V6. This return circuit 7 is provided for returning the treatment liquid back to the processing container, in order to release the pump 2 from excess load during the cleaning operation of either one of the magnetic filters 3.

Figure 2:
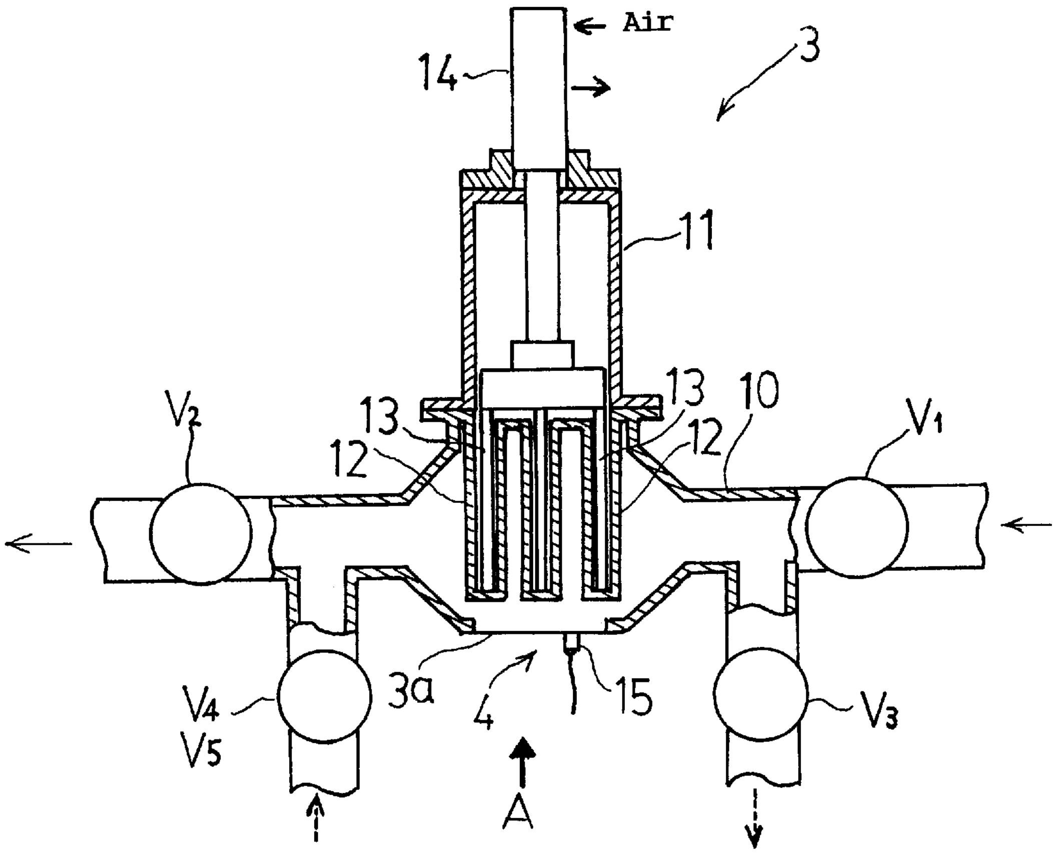
FIG. 2 is a sectional view of a magnetic filter according to the present invention.

The magnetic filter 3 comprise, as shown in FIG. 2, a cylindrical body 11 attached to a circular conduit 10, a plurality of powder collecting cylinders 12 which are connected to the cylindrical body 11 and that project into the inside of a circular conduit 10 as a metal powder attaching portion, a plurality of magnets 13 which are freely detachable into and out of the respective metal powder collecting cylinders 12, and an air cylinder unit 14 for reciprocally moving the magnets 13 as a whole simultaneously, wherein the number of the plural powder collecting cylinders 12 in the present embodiment is seven (7) in total, including the collecting cylinder 12 positioned at the center of the cylindrical body 11 and the six collecting cylinders 12 therearound.

In addition, under the condition that the magnets 13 are inserted inside of the metal powder collecting cylinders 12, the metal powder contained in the treatment liquid is magnetically attracted toward the magnets 13 to become attached upon the surfaces thereof, while under the condition that the magnets 13 are drawn out of the metal powder collecting cylinders 12 by operation of the air cylinder unit 14, no magnetic attractive effect is exerted on the magnetic powder The above-mentioned detection portion 4 is, in the first embodiment, attached onto the magnetic filters 3, thereby detecting the amount of metal powder attached onto the metal powder collecting cylinders 12 using an ultrasonic reflection method.

Figure 3:
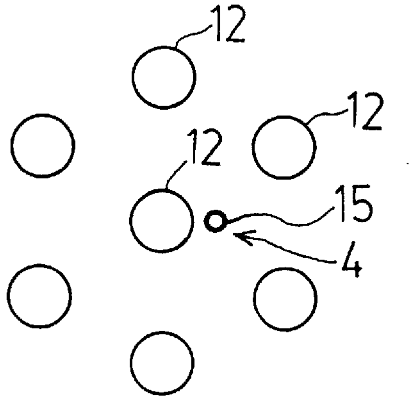
FIG. 3 is an enlarged view seen from the direction of arrow A in FIG. 2, showing a position where a sensor employing the method of ultrasonic beam reflection is attached.

As shown in FIGS. 2 and 3, a portion of the magnetic filters 3 in a vicinity of the metal powder collecting cylinders 12 comprises a transparent plate **3*a* of, for example, an acrylic resin, and an ultrasonic sensor 15 is attached in the vicinity of the central powder collecting cylinder 12 on the acrylic plate 3*a*, whereby, after emitting ultrasonic waves along with an axial direction of the round portion of the metal powder collecting cylinder 12, it is possible to receive reflected waves which are reflected from the bottom surface of the metal powder collecting cylinder 12**.

Figure 4:
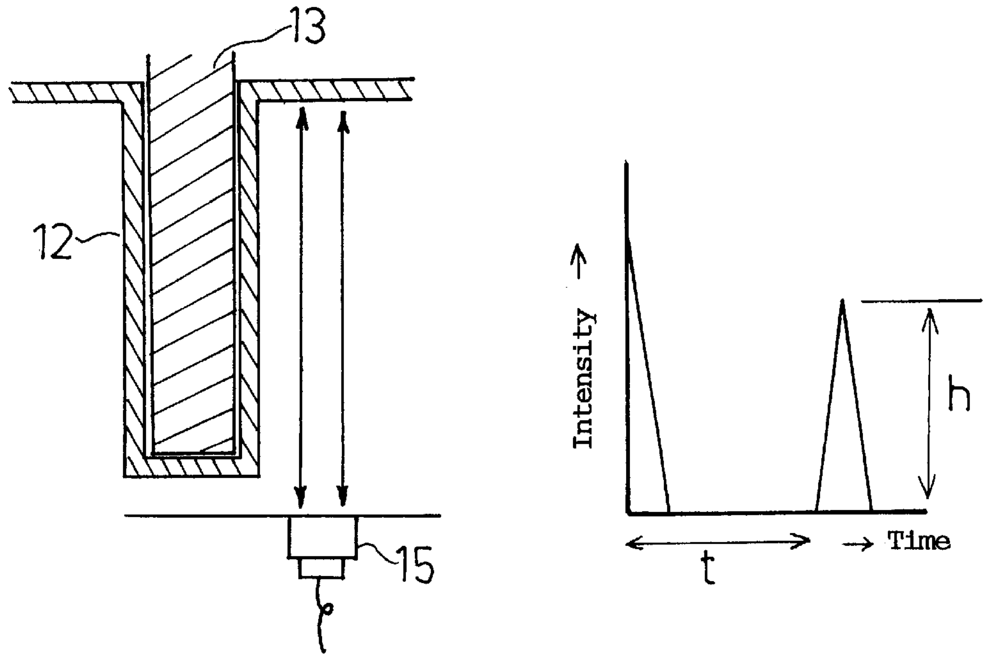
FIGS. 4(A) and (B) are views showing the principle of measuring using the ultrasonic beam reflection method, and in particular.
Figure 4:
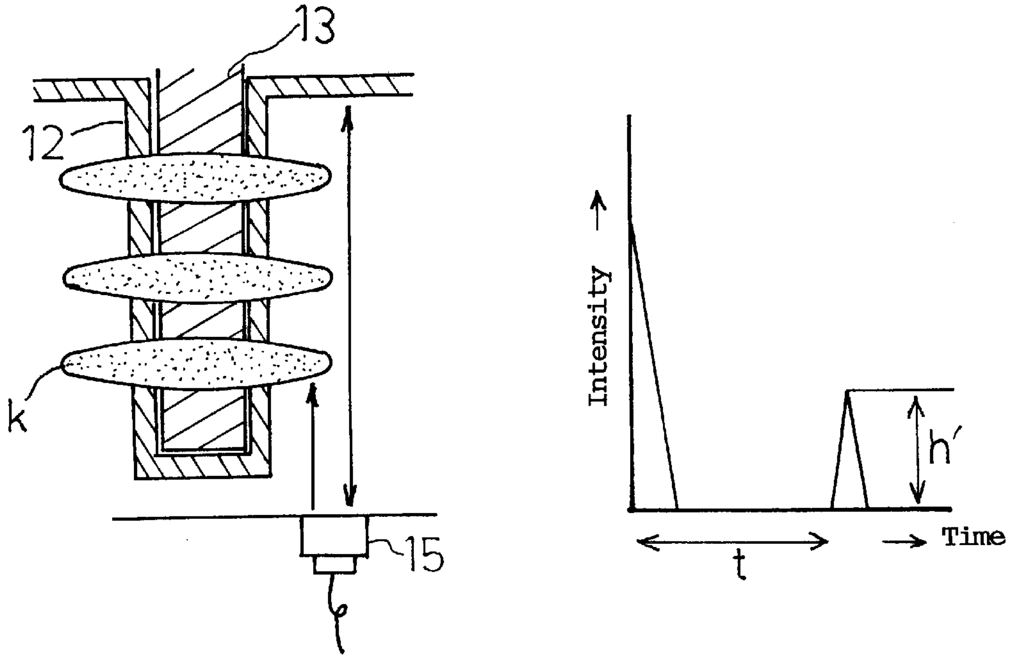

Explaining this measurement according to the ultrasonic reflection method, on the basis of FIG. 4, in particular as is shown in FIG. 4(A), in the case where no metal powder is attached on the metal powder collecting cylinder 12, an intensity h (in the vertical axis) of reflection with respect to time t (in the horizontal axis) can be detected, as is indicated in a graph shown in the right-hand side of the figure. Further, in the case where some metal powder k is attached thereon, as is shown in FIG. 4(B), a reflection intensity h' can be detected, being attenuated in the vertical axis as is indicated in a graph shown in the right-hand side of the figure. For instance, if half of the ultrasonic wave is attenuated, the reflection intensity is reduced to a half of the original emitted or outputted wave (h/2) (i.e., being decreased by several dB).

Further, for the ultrasonic wave sensor 15 according to the ultrasonic wave reflection method, a sensor having a narrow beam extension and a high frequency (for example, around 10 MHz) is preferable.

Here, the reason for attaching the sensor in the vicinity of the central metal powder collecting cylinder 12 is that the metal powder attaches to it under a stable condition, as compared to the situation of the peripheral metal powder collecting cylinders 12.

Further, the reason for using the transparent acrylic plate 3*a* at the portion on which the ultrasonic sensor 15 is attached is that it is convenient for visually ascertaining the amount of metal powder accumulated on the metal powder collecting cylinders 12.

Though FIG. 4(B) shows the condition where some metal powder k is attached or adhered separated in the axial direction, and this effect is shown a little bit exaggerated in the figure. It is also common for the metal powder K to adhere in other distributions, such as in waves.

In the manner mentioned above, when it is detected that the metal powder attached on the metal powder collecting cylinder 12 has reached a predetermined amount, then a cleaning start signal is generated to control the electro-magnetic valves in a manner which will be mentioned later.

In this connection, the time of the start of cleaning happens before the magnetic filter 3 reach their limits with respect to capacity of collection.

Figure 5:
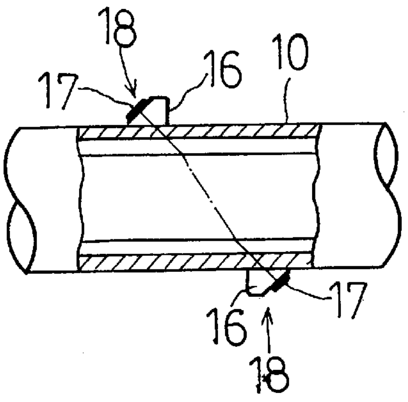
FIG. 5 is an explanatory view showing measurement using ultrasonic wave permeation.

Next, the detection means employing an ultrasonic permeating method, being constructed as a second embodiment, will be explained by referring to the FIG. 5.

The ultrasonic permeating method is a method in which sensors 18, each comprising an ultrasonic wave oscillator 17 attached onto a wedge 16 for transmitting ultrasonic waves obliquely, are attached at upside and downside locations of the circular conduit obliquely, so as to send and receive the ultrasonic wave pulses mutually therebetween, thereby obtaining the amount of metal powder contained in the treatment liquid based on the time taken for transmission of the pulses. For example, the sonic velocity in water is 1,500 m/sec, while the velocity in steel is 5,900 m/sec. Therefore, the transmission time becomes shorter if the amount of metal powder contained in the treatment liquid becomes large, or if the liquid becomes contaminated.

Here, the sensor 18 for this ultrasonic permeating method is provided either at a downstream location with respect to the magnetic filters 3, or alternatively, at the conduit before and after the magnetic filters 3.

In the case where it is provided at the downstream location with respect to the magnetic filter 3, it is so adjusted that it generates an instruction signal for starting the cleaning, based upon the amount of metal powder contained in the treatment liquid at the downstream side, at the time point when the collection ability of the magnetic filters 3 reach the limit. On the other hand, in the case where it is provided both at before and after locations with respect to the magnetic filters 3, the instruction for starting the cleaning is generated at the time point, for example, when the amount of metal powder contained in the treatment liquid at the downstream side is larger than that in the upstream side thereof.

Figure 6:
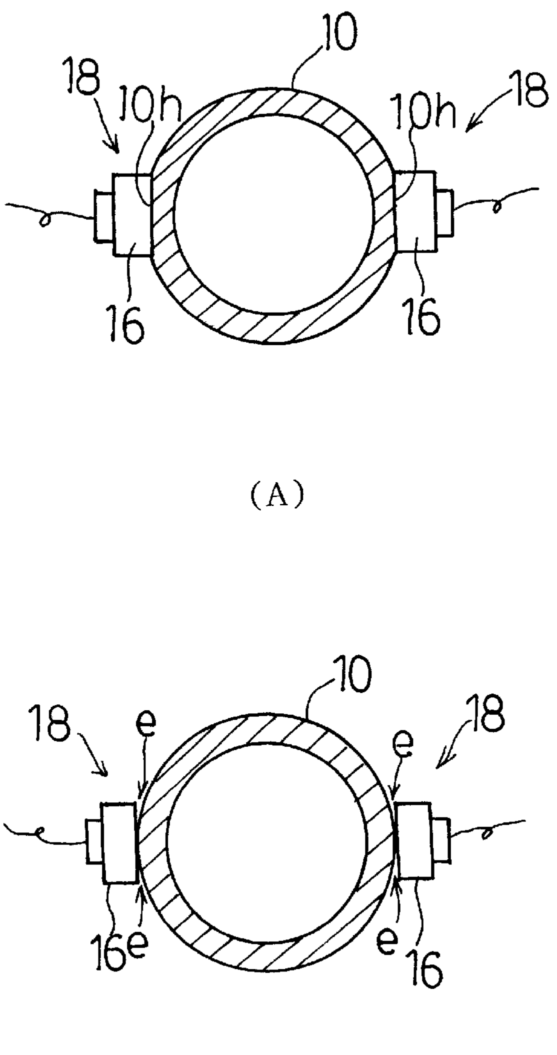
FIGS. 6(A) and (B) show the attachment of a sensor employing the ultrasonic wave permeation method.

Further, with attachment of the ultrasonic sensors 18 employing the ultrasonic permeating method, as is shown in FIG. 6(A), the outer surfaces of the conduit 10 are machined by, for example, milling cutting, etc., so as to become the flat surfaces 10*h*, 10*h*, and two wedges 16, 16 for both sensors 18, 18 are attached in parallel to the attaching surfaces. This is because, if the conduit 10 has a curved surface as it is, an air layer e will lie between the attachment surface of the wedge 16 of the sensor 18 and the surface of the conduit 10, thereby resulting in the generation of noise.

Next, the detection means using a coil detection method, being constructed as a third embodiment, will be explained on the basis of FIG. 7.

Figure 7:
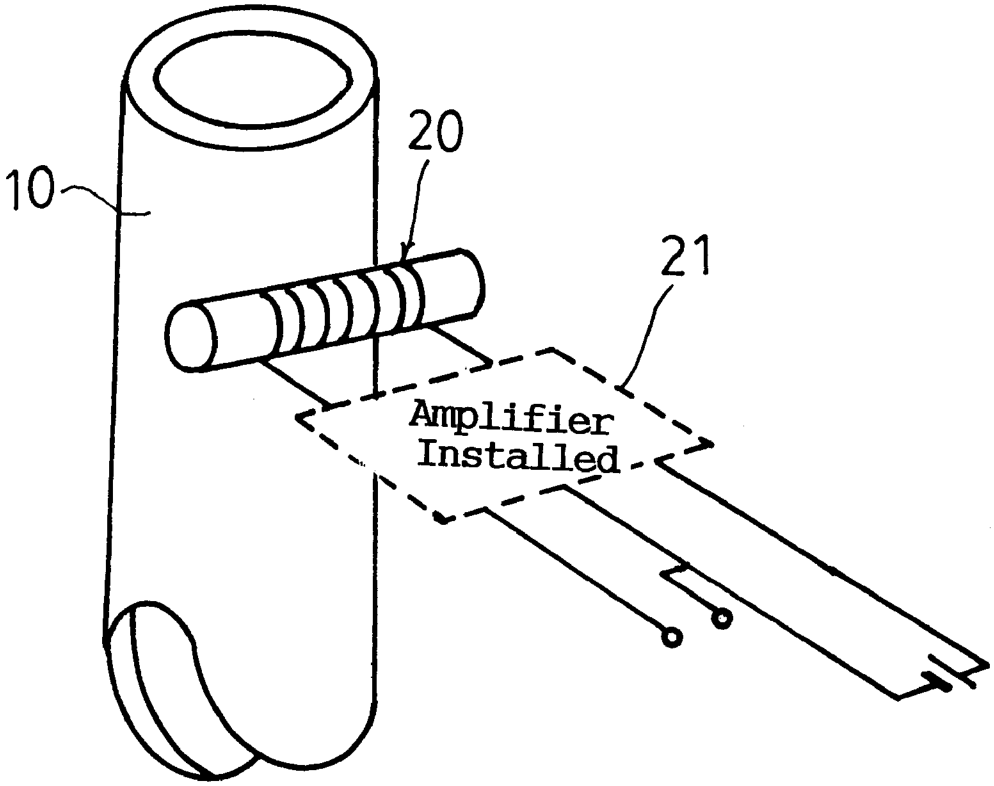
FIG. 7 is a schematic view showing a coil detection method.

In this coil detection method, utilizing the principle that conductive material can change an induction current when it passes within a magnetic field, as shown in FIG. 7, a coil 20 is positioned in the vicinity of the conduit 10, through which current flows so as to apply a magnetic field at a right angle (90°) with respect to the flow of the treatment liquid, and the resulting change in the induction current is measured through an amplifier 21.

In addition, such a coil 20 is provided on the conduit 10 at the downstream location of the magnetic filters 3, or on the conduit 10 at the before and after locations with respect to the magnetic filters 3.

In this connection, this coil detection method is usually convenient. However, ordinarily the circular conduit 10 is made of a ferromagnetic material, such as steel pipe, and therefore, a portion of the conduit 10 to which the coil is attached must be replaced by a resin pipe, such as a pipe of vinyl chloride, or a pipe of acrylic resin, etc.

Next, an explanation will be given on control of the electromagnetic valves in the cleaning apparatus mentioned above, in particular, on behalf of the ultrasonic wave reflection method shown in FIGS. 1 through 4, with reference FIG. 8. Here, although the circuit diagram shown in an upper part of FIG. 8 is same as that shown in FIG. 1, there are further disclosed a processing container S, a discharge tank H, a container T for processed liquid, etc.

Namely, in the circuit diagram in the upper part, the contaminated treatment liquid stored in the processing container S contains a large amount of metal powder therein to be removed, and this treatment liquid is, after being pumped thereinto by the pump 2, sent to the magnetic filters 3 through the first electro-magnetic valves V1 and the circular passage 1.

In the magnetic filters 3, since the magnets 13 are inserted into the cylinders of the powder collecting cylinders 12, the metal powder attaches upon the surfaces of the powder collecting cylinders 12, and the treatment liquid from which the metal powder is removed is sent through the detection portions 4 and the second electromagnetic valves V2 into the container T for processed liquid (shown by the double solid line arrow in the figure).

Conditions of each of the electromagnetic valves at this moment are as disclosed in the column marked: "During Removal of Iron", at the left-hand side on a time chart shown below the figure, i.e., the first and second electro-magnetic valves V1 and V2 are in the "open" condition, and the remaining third, fourth and fifth electro-magnetic valves V3, V4 and V5 are in the "closed" condition. Further, the magnets 13 of the magnetic filters 3 are in the condition of "collecting metal powder (ON)," in which they are inserted into the metal powder collecting cylinders 12.

Next, when the detection portion 4 detects that the metal powder that has accumulated on the powder collecting cylinder 12 has reached the predetermined amount, the cleaning start signal is generated so as to actuate the cleaning circuit 5.

Namely, after closing the first electro-magnetic valve V1, the second electro-magnetic valve V2 is closed so as to close the circular passage 1 between the first electromagnetic valve V1 and the second electro-magnetic valve V2. Thereafter, the third electro-magnetic valve V3 is opened and then the fourth electro-magnetic valve V4 is opened. The air cleaning circuit **5*a* and the discharge circuit 6 are connected to a closed system portion of the circular passage 1**.

Further, the magnet 13 of the magnetic filter 3 is drawn out from the metal powder collecting cylinder 12, and thereby it is under the condition of being demagnetized (OFF).

Therefore, the cleaning air is kept from being output toward the magnetic filters 3, and the treatment liquid remaining inside of the closed system and the metal powder accumulated onto the powder collecting cylinder 12 are discharged through the discharging circuit 6 into the discharge tank H.

In addition, after passing a certain period of time, the fourth electromagnetic valve V4 is closed and the fifth electromagnetic valve V5 is opened, and then the cleaning water is supplied in place of the cleaning air. With this cleaning water, the metal powder attached around the metal powder collecting cylinder 12 is positively removed, and is also discharged through the discharging circuit 6 into the discharge tank H (shown by the double chained line arrow in the figure).

However, the treatment liquid pumped by the pump 2 is returned through the return circuit 7 back to the processing container S so as to release the pump 2 from being applied with an excessive load.

In this connection, in the vicinity of the discharge tank H, there are provided a filter f for dividing the metal powder and filtering liquid, and an iron powder tank for accumulating the metal powder collected by the filter f, and also the circular passage 8 is connected between the discharge tank H and the processing tank S while a pump p is provided on the way or passage thereof. When the level of the filtering liquid reaches a predetermined level, the pump p is actuated so as to return the filtering liquid back to the processing container S.

When finishing the cleaning, the magnets 13 of the magnetic filters 3 is inserted again into the metal powder collecting cylinders 12 (ON), the second electromagnetic valve V2 is opened after the fifth electromagnetic valve V5 and the third electromagnetic valve V3 are closed, and at the end, the first electromagnetic valve V1 is opened to return it to the condition of “removal of iron”.

In addition, the operation of the electromagnetic valves mentioned above is controlled automatically.

With the construction of the device above, both of the magnetic filters 3 are cleaned before reaching their collection limit so as to prevent them from suffering decreased capacity for removing the metal powder, and in the cases of the control methods with the ultrasonic wave permeating method and the coil detection method, the electromagnetic valves are also controlled in the same manner.

However, the present invention should not be restricted only to the embodiments mentioned above. Those devices having substantially the same construction as those described in the pending claims of the present invention, or performing substantially the same function thereto also fall within the technical breadth of the present invention.

For example, the present device and method can be applied not only to pre-processes related to painting car bodies, but is also applicable to a cleaning device for the magnetic filters 3 for various other treatment liquids, and also the filter 3 can be constructed in other ways. An advantage of the present invention is that the cleaning time is detected by the cleaning time detection means positioned in the vicinity of the magnetic filter, and the detection signal thereof actuates the valves of the cleaning circuit, so as to initiate the cleaning of the magnetic filter automatically. Therefore, the drawback whereby the capacity of the magnetic filter is decreased and deteriorated in function for removal of the metal powder can be avoided.

Further, since the detection portion for measuring the amount of metal powder attached onto the magnetic filter or filters is provided as the cleaning time detection means, the appropriate determination of the cleaning time can be achieved. Also, since the detection means is constructed employing the ultrasonic sensor for transmitting the ultrasonic waves in a reflective way in the vicinity of the metal powder attaching portion of the magnetic filter, simple construction thereof as a single sensor is thereby enabled.

Further, since the detection portion, as the other cleaning time detection means, is provided for measuring the amount of metal powder contained in the treatment liquid in the passage at the downstream location lower than the magnetic filter, the attachment of the sensor onto the conduit without various restriction imposed by the traditional arts, so as to construct the same simply and cheaply, is thereby enabled.

Further, since the respective detection portions for measuring the metal powder contained in the treatment liquid in the passage before and after the magnetic filter are provided as the other cleaning time detection means, simple and cheap construction thereof is thereby enabled, as well as enabling appropriate determination of the cleaning time.

In addition, if the detection portion is constructed with the ultrasonic sensor for measuring the permeating velocity of the ultrasonic waves through the treatment liquid, it is convenient since existing flow sensors can be applied thereto. Further, by machining the surface of the passage conduit of the treatment liquid on which the ultrasonic sensor is attached to be flat, the accuracy in the measurement can be increased.

Furthermore, the detection portion is constructed for measuring the amount of metal powder in the treatment liquid by the coil positioned in the vicinity of the conduit for the treatment liquid, thereby enabling a simple construction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cleaning apparatus for a magnetic filter, for cleaning said magnetic filter which collects metal powder from a treatment liquid flowing within a liquid passage, comprising:

a cleaning circuit to remove the metal powder from the magnetic filter, the magnetic filter having collecting protrusions and magnet elements, the collecting protrusions each having a receptacle for housing a magnet element;

cleaning time detection means being provided in a vicinity of said magnetic filter for determining a cleaning time for said magnet filter, said cleaning time detection means detecting an amount of metal powder on an exterior surface of the collecting protrusions; and means for actuating a valve of said cleaning circuit upon receipt of a detection signal from said cleaning time detection means, whereby cleaning of said magnetic filter is actuated automatically.

2. A cleaning apparatus for a magnetic filter as defined in claim 1, wherein said cleaning time detection means comprises a detection portion for measuring said amount of metal powder on the exterior surface of the collecting protrusions of said magnetic filter, whereby the cleaning time can be determined on a basis of detected data from said detection portion.

3. A cleaning apparatus for a magnetic filter as defined in claim 2, wherein said detection portion includes an ultrasonic sensor which outputs ultrasonic waves in a vicinity of the collecting protrusions of said magnetic filter and receives reflected waves thereof, whereby the cleaning time can be determined based on an intensity of the reflected waves.

4. A cleaning apparatus for a magnetic filter as defined in claim 1, wherein said cleaning time detection means comprises a detection portion for measuring an amount of metal powder in the treatment liquid at a downstream location lower than said magnetic filter, whereby the cleaning time can be determined on a basis of detected data from said detection portion.

5. A cleaning apparatus for a magnetic filter as defined in claim 4, wherein said detection portion includes an ultrasonic sensor for measuring a permeating velocity of ultrasonic waves through the treatment liquid.

6. A cleaning apparatus for a magnetic filter as defined in claim 5, wherein a conduit of said passage of the treatment liquid, on which said ultrasonic sensor is attached, is formed with a flat surface for attaching said ultrasonic sensor thereon.

7. A cleaning apparatus for a magnetic filter as defined in claim 4, wherein said detection portion includes a sensing coil positioned in a vicinity of said conduit of the treatment liquid, the sensing coil detecting the passage of metal powder through the liquid passage.

8. A cleaning apparatus for a magnetic filter as defined in claim 1, wherein said cleaning time detection means comprises detection portions for measuring an amount of metal powder in the treatment liquid before and after said magnetic filter, respectively, whereby the cleaning time can be determined based on a comparison between detected data from said detection portions.

9. A cleaning apparatus for a magnetic filter as defined in claim 1, wherein said protrusions are hollow cylindrical bodies, the cylindrical bodies extending into a chamber of the magnetic filter.

10. A cleaning apparatus for a magnetic filter as defined in claim 9, wherein the magnet elements are selectively disposed within the receptacles of the hollow cylindrical bodies, the magnets being withdrawn from the receptacles prior to cleaning of the magnetic filter.

11. A cleaning apparatus for a magnetic filter as defined in claim 1, wherein the cleaning time detection means is mounted on a plate of the magnetic filter, the plate being opposed to end surfaces of the collecting protrusions.

12. A cleaning method for a magnetic filter for cleaning the magnetic filter which collects metal powder from a treatment liquid flowing within a liquid passage, comprising the following steps:

detecting a condition of collecting protrusions of said magnetic filters, each collecting protrusion having a receptacle for housing a magnet element;

determining a cleaning time for said magnetic filter on a basis of the detected condition of said magnetic filter; and actuating a valve of a cleaning circuit so as to remove the metal powder from the collecting protrusions of the magnetic filter, upon the determination of the cleaning time for said magnetic filter, whereby the cleaning of said magnetic filter is actuated automatically.

13. A cleaning method for a magnetic filter as defined in claim 12, wherein said detecting of the condition of said magnetic filter is conducted by measuring an amount of metal powder attached onto said collecting protrusions of said magnetic filter, whereby the cleaning time is determined on a basis of detected data from the measurement of the amount of the attached metal powder attached onto said collecting protrusions.

14. A cleaning method for a magnetic filter as defined in claim 13, wherein said detection of the condition of said magnetic filter is conducted by means of an ultrasonic sensor which outputs ultrasonic waves in a vicinity of the collecting protrusions of said magnetic filter and receives reflected waves thereof, whereby the cleaning time is determined based on an intensity of the reflected waves detected by said ultrasonic sensor.

15. A cleaning method for a magnetic filter as defined in claim 12, wherein said detection of the condition of said magnetic filter is conducted by measuring the amount of the metal powder in the treatment liquid at a downstream location lower than said magnetic filter, whereby the cleaning time is determined based the measured amount of metal powder obtained thereby.

16. A cleaning method for a magnetic filter as defined in claim 15, wherein said measurement is conducted with an ultrasonic sensor for measuring a permeating velocity of ultrasonic waves through the treatment liquid.

17. A cleaning method for a magnetic filter as defined in claim 12, wherein said detection of the condition of said magnetic filter is conducted by measuring an amount of metal powder in the treatment liquid before and after said magnetic filter, respectively, whereby the cleaning time is determined based on a comparison between detected data therefrom.

18. A cleaning method for a magnetic filter as defined in claim 12, wherein the step of determining a condition of the collecting protrusions includes the steps of:

transmitting a sensing signal across a chamber of the magnetic filter using a sensor, the signal impinging on the collecting protrusions; and receiving a reflected portion of said sensing signal at said sensor.

19. A cleaning method for a magnetic filter as defined in claim 12, further comprising:

prior to actuating the valve of the cleaning circuit, withdrawing the magnet elements from the receptacles of the collecting protrusions; and after the metal powder has been removed from the collecting protrusions, moving the magnet elements into the receptacles of the collecting protrusions.

20. A cleaning apparatus for a magnetic filter as defined in claim 12, wherein the collecting protrusions are hollow cylindrical bodies, the step of actuating the valve of the cleaning circuit acting to admit cleaning fluid into the magnetic filter, the cleaning fluid removing metal powder from the exteriors of the hollow cylindrical bodies.

* * * * *